United States Patent
Kolberg et al.

(10) Patent No.: US 8,360,087 B2
(45) Date of Patent: Jan. 29, 2013

(54) OPERATING FLUID TANK

(75) Inventors: Ralf Kolberg, Bruhl (DE); Jaroslav Maglovsky, Bonn (DE); Volker Treudt, Windeck (DE); Robert Schwar, Dresden (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 363 days.

(21) Appl. No.: 12/718,333

(22) Filed: Mar. 5, 2010

(65) Prior Publication Data

US 2010/0223917 A1 Sep. 9, 2010

(30) Foreign Application Priority Data

Mar. 6, 2009 (DE) .................. 10 2009 011 516

(51) Int. Cl.
*F24D 19/08* (2006.01)
(52) U.S. Cl. ........ 137/200; 137/177; 137/351; 137/587; 60/295; 200/746
(58) Field of Classification Search ............. 137/588, 137/177, 183, 188, 173, 200, 587, 351, 899, 137/201; 60/282, 295; 220/562, 745
See application file for complete search history.

(56) References Cited

U.S. PATENT DOCUMENTS

| | | | | |
|---|---|---|---|---|
| 2,686,399 A | * | 8/1954 | Stoltz ........................... | 60/295 |
| 6,557,719 B1 | | 5/2003 | Arnal et al. | |
| 6,722,124 B2 | * | 4/2004 | Pawson et al. .................. | 60/295 |
| 6,783,022 B2 | | 8/2004 | Essing | |
| 6,823,663 B2 | * | 11/2004 | Hammerle et al. ............. | 60/295 |
| 2004/0074229 A1 | * | 4/2004 | Upadhyay et al. .............. | 60/295 |
| 2007/0240405 A1 | * | 10/2007 | Nishina et al. .................. | 60/295 |
| 2009/0038296 A1 | | 2/2009 | Fukuda et al. | |

FOREIGN PATENT DOCUMENTS

| | | |
|---|---|---|
| DE | 2443822 | 9/1974 |
| DE | 2509428 | 9/1976 |
| EP | 0425862 | 3/1993 |
| EP | 1149722 | 10/2001 |
| EP | 2006503 | 12/2008 |
| FR | 2774951 | 8/1999 |

OTHER PUBLICATIONS

International Search Report dated Apr. 27, 2010 in related International Patent Application No. PCT/EP2010/001229.

* cited by examiner

*Primary Examiner* — Craig Schneider
*Assistant Examiner* — Craig J Price
(74) *Attorney, Agent, or Firm* — Grossman Tucker Perreault & Pfleger, PLLC

(57) ABSTRACT

The invention relates to a reducing agent tank for holding a liquid reducing agent as a so-called SCR tank. The SCR tank comprises at least one device for deaerating the tank, which device is closed off by means of at least one pressure-compensating element which permits an exchange of gas but which closes off the tank in a liquid-tight manner. The reducing agent tank also comprises at least one deaeration line which communicates with the pressure-compensating element, with the deaeration line being guided at least to a point above the maximum permissible fording level of the tank when the tank is in the installation position. The deaeration line has at least one first downward-sloping line section which branches into a second rising line section for deaeration and a third falling line section for gravity-induced condensate drainage.

5 Claims, 2 Drawing Sheets

Figures 3, 4:
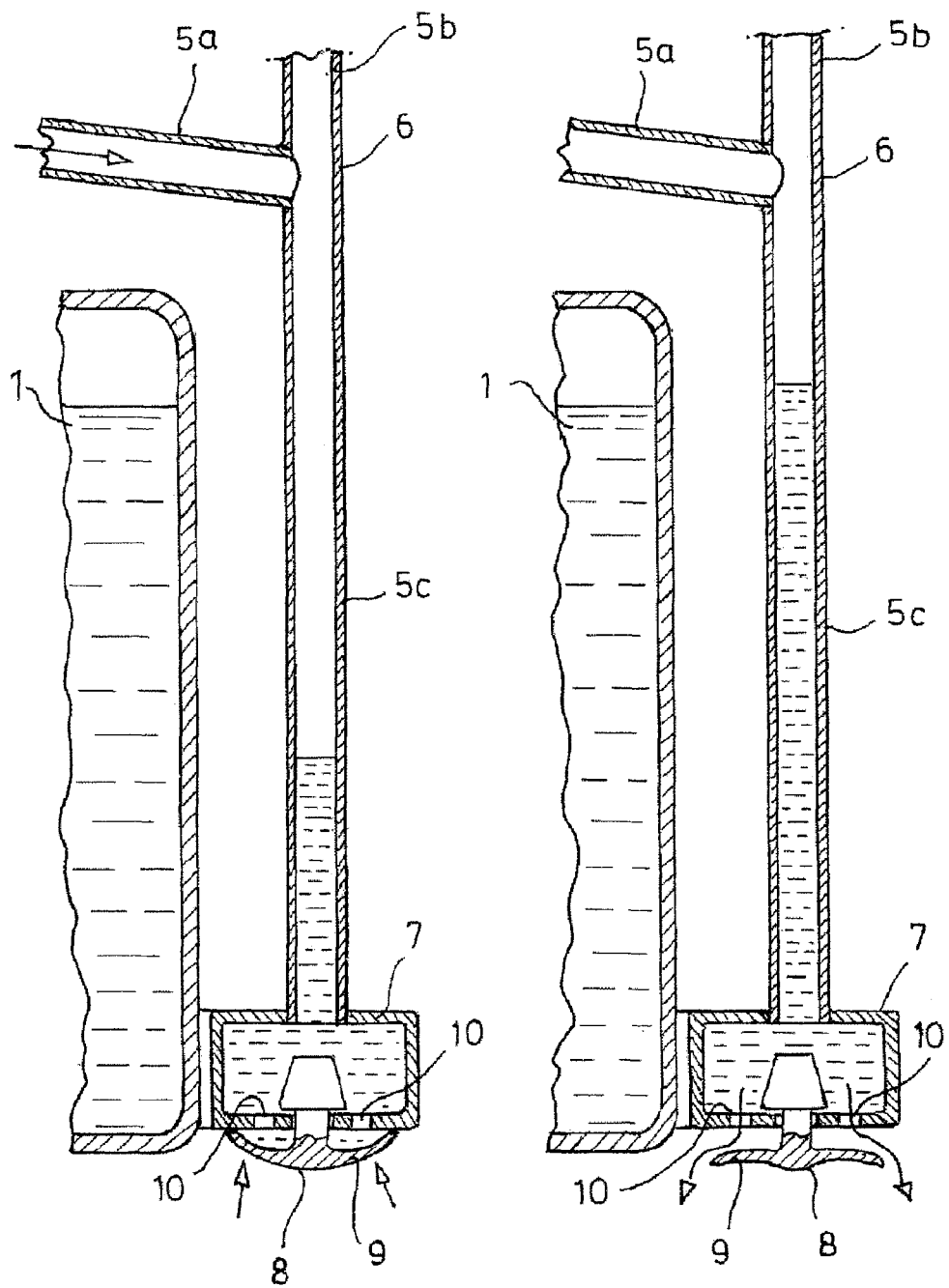

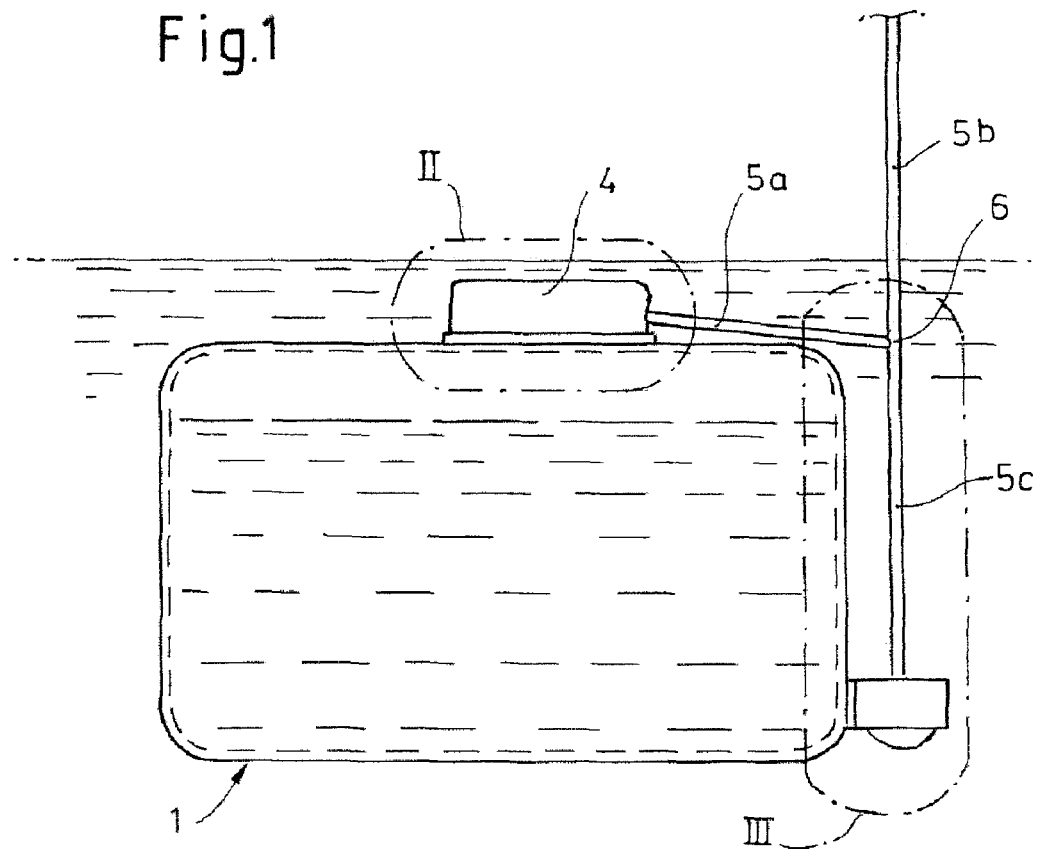
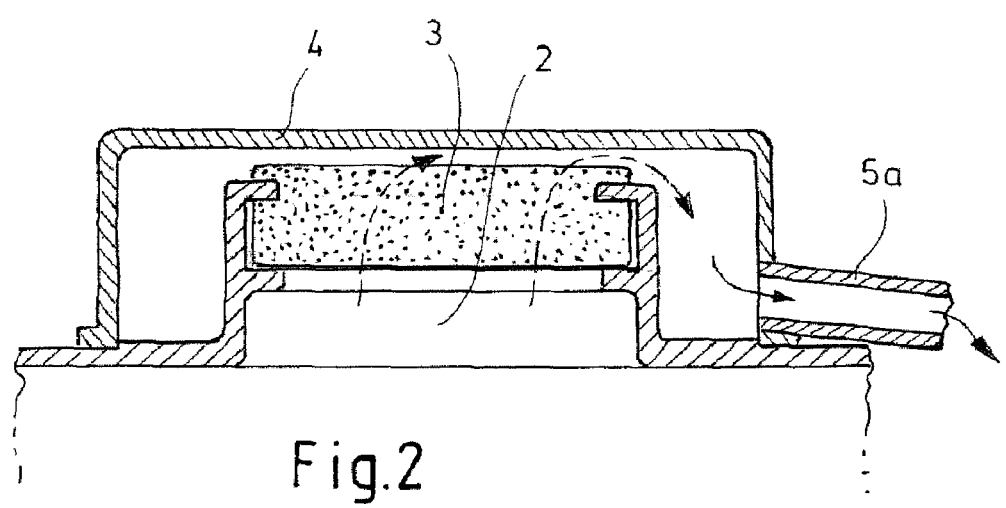

OPERATING FLUID TANK

CROSS-REFERENCE TO RELATED APPLICATIONS

This application claims the benefit of German Patent Application No. 10 2009 011 516.1 filed Mar. 6, 2009 which is incorporated by reference herein.

BACKGROUND

The invention relates to an operating fluid tank for a motor vehicle, in particular a reducing agent tank for holding a liquid reducing agent for catalytic exhaust-gas denitrogenization. In the exhaust-gas purification of diesel vehicles, use is frequently made of the so-called SCR process, primarily in utility vehicles. SCR refers to so-called Selective Catalytic Reduction in which nitrogen oxides are reduced by means of ammonia. Here, the required ammonia is for example injected in the form of an aqueous urea solution into the exhaust section upstream of the SCR catalytic converter. Ammonia and carbon dioxide are produced from the urea-water solution by means of a hydrolysis reaction. The ammonia can react, in a catalytic converter at a corresponding temperature, with the nitrogen oxides in the exhaust gas.

SUMMARY

A reducing agent tank is conventionally provided in the vehicle in question for the urea which is present in aqueous solution. The urea then releases ammonia, which can lead to the emission of an unpleasant odour. The drying-out of the solution is associated with intense crystal growth and an increase in volume. Therefore, reducing agent tanks carried in the motor vehicle must be prevented from drying out. Known reducing agent tanks are closed off by means of a pressure-compensating element which permits an exchange of gas to a limited extent but which closes off the tank in a liquid-tight fashion. The pressure-compensating elements in known operating fluid tanks comprise for example sintered covers which permit an exchange of gas but which are impermeable to liquid. It is also known to provide pressure-compensating elements in the form of non-return valves. In particular, pressure-compensating elements with plugs composed of sintered material are functionally impaired if wetted by a liquid.

Not least for this reason, known reducing agent tanks are only suitable to a limited extent for use in all-terrain vehicles. In all-terrain vehicles, there is often a requirement for a certain fording capability, wherein it is not possible to preclude significant parts of the vehicle at least briefly passing below the water level of the body of water to be forded. In known designs of SCR tanks, the fording capability is only limited.

The invention is therefore based on the object of providing an operating fluid tank, in particular a reducing agent tank for holding a liquid reducing agent for catalytic exhaust-gas denitrogenization, which is suitable for use in a vehicle with fording capability and whose functionality is ensured even during fording operation.

The object is achieved by means of an operating fluid tank for a motor vehicle, in particular by means of a reducing agent tank for holding a liquid reducing agent for catalytic exhaust-gas denitrogenization, comprising at least one device for deaerating the tank, which device is closed off by means of at least one pressure-compensating element which permits an exchange of gas but which closes off the tank in a liquid-tight manner, and comprising at least one deaeration line which communicates with the pressure-compensating element, with the deaeration line being guided at least to a point above the maximum permissible fording level of the tank when the tank is in the installation position, and with the deaeration line having at least one first downward-sloping line section which branches into a second rising line section for deaeration and a third falling line section for gravity-induced condensate drainage.

According to the invention, reliable deaeration is ensured in this way even if the reducing agent tank is situated below the water level. It is however simultaneously ensured that the deaeration line is kept free of condensate; condensate formation in a rising line would specifically lead under some circumstances to a blockage of the deaeration line. In the case of a rising line, water which has condensed in the line can accumulate in the region of the pressure-compensating element and prevent the ventilation there. An exclusively falling arrangement of the deaeration line can under some circumstances be unfavourable because, when travelling through cold water, the gas phase in the reducing agent tank can contract, such that either cold water or condensate is sucked in by the reducing agent tank.

In contrast, it is provided according to the invention that a first line section of the deaeration line is of falling or downward-sloping design in order to ensure a discharge of condensate, a second line section is arranged so as to rise for the purpose of deaeration, and a third line section is provided for condensate drainage. Expediently, at least the third line section is closed off by means of a drainage valve which reliably prevents the infiltration of water from the outside during the fording process. The second, upper line section ends preferably in a region of the motor vehicle which is situated a considerable distance above the region which is submerged in the water. The end in question of the line section may for example be arranged in a protected body region of the motor vehicle such that no further protective measures against water or dirt infiltration are necessary.

In one preferred embodiment of the operating fluid tank according to the invention, it is provided that the length of the third line section is dimensioned such that the drainage valve can be actuated by the liquid column of the accumulated condensate. The length of the downwardly extending third line section is furthermore selected such that a sufficient level spacing is always maintained between the condensate level in the line section and the pressure-compensating element.

It is particularly advantageous if the drainage valve is closed when unloaded.

For example, the drainage valve may have at least one flexible and/or spring-loaded valve body whose hydraulically acting surfaces are dimensioned such that a rising liquid level from the outside intensifies the closing force and such that condensate drainage on account of a rising liquid level from the inside takes place only if the drainage valve is situated above the fording level.

The drainage valve may be designed for example as a so-called mushroom valve. It is also possible for different designs of non-return valve to be provided as a drainage valve instead of a mushroom valve.

One preferred embodiment of the operating fluid tank according to the invention is explained below on the basis of an exemplary embodiment which is illustrated in the drawings. Even though the preferred embodiment of the operating fluid tank according to the invention is a reducing agent tank, said operating fluid tank may also be used within the scope of the invention for other applications, for example as a tank for washer fluid or as a fuel tank.

FIGURES

FIG. 1 shows a schematic view of the reducing agent tank according to the invention in the submerged state, FIG. 2 shows an enlarged view of the detail II in FIG. 1, FIG. 3 shows an enlarged sectional view of the detail III shown in FIG. 1, with the drainage valve being situated in the closed position, and FIG. 4 shows a view corresponding to FIG. 3, with the drainage valve open.

DETAILED DESCRIPTION

The reducing agent tank 1 as illustrated in FIG. 1 may be composed of any desired material and be produced in any desired manner. The reducing agent tank 1 is however preferably composed of a thermoplastic and produced by extrusion blow-moulding. Said reducing agent tank 1 may for example be arranged hidden in the rear region of the body of a motor vehicle or arranged in the engine bay of a motor vehicle. The reducing agent tank 1 serves to hold urea which is present in aqueous solution and which is injected into the exhaust section of the motor vehicle upstream of the so-called SCR catalytic converter. Ammonia and carbon dioxide are produced from the urea-water solution by means of a hydrolysis reaction. The ammonia can, in the SCR catalytic converter at a corresponding temperature, effect a reduction of the nitrogen oxides in the exhaust gas.

As can be seen in particular from the figures, a central aeration and deaeration opening 2 is provided on the upper side of the reducing agent tank 1 in the installation position, which aeration and deaeration opening 2 is closed off by means of a pressure-compensating element 3. The pressure-compensating element 3 may be formed for example as a closure body in the form of a porous, sintered plate. The porous sintered body may for example be formed from UHDPE (ultra high density polyethylene) which is oleophobized and/or hydrophobized. Said material is permeable to gas but impermeable to liquids.

The pressure-compensating element 3 is encased by a deaeration hat 4 in the form of a cap which forms a housing. A deaeration line 5a, 5b, 5c is connected to the deaeration hat 4. At this juncture, it is pointed out that other functional elements of the reducing agent tank 1 are not illustrated for reasons of simplicity. The reducing agent tank 1 comprises at least one filler opening to which for example a filler neck may be connected. Furthermore, means for filling deaeration and means for fill level limitation during the filling process may be provided.

The deaeration line 5 comprises a total of three line sections 5a, 5b and 5c, with a first line section 5a being arranged in a downward-sloping fashion in relation to the approximately horizontal installation position of the reducing agent tank 1 or in relation to the liquid level which is generated in said reducing agent tank 1, as can be seen in particular from FIG. 1. The first line section 5a of the deaeration line 5 extends approximately rectilinearly, that is to say without forming a siphon, to a branch 6 where the deaeration line 5 branches into a second rising line section 5b and a third falling line section 5c. The second and third line sections 5b and 5c of the deaeration line extend in each case in opposite directions upwards and downwards respectively. The terms "up" and "down" relate in each case to the installation position of the reducing agent tank 1 in the motor vehicle. The expression "up" refers to a direction counter to the force of gravity, whereas the expression "down" refers to the direction of the force of gravity.

Reference is now made to FIGS. 3 and 4, which show in each case an enlarged sectional view of the branch 6 and of the third line section 5c of the deaeration line 5. The third line section 5c, which serves primarily for the drainage of the deaeration line 5, opens out at its lower end into a valve housing 7 which is closed off by means of a mushroom valve 8. The mushroom valve 8 comprises a flexible valve body 9 which closes off two drainage openings 10 of the valve housing 7. The drainage valve, which is designed as a mushroom valve 8, is closed when the valve body 9 is unloaded. If condensate accumulates in the deaeration line 5 during the operation of the motor vehicle, the condensate will pass under the force of gravity firstly through the first downward-sloping line section 5a to the branch 6, and from there the condensate will pass into the third, vertically downwardly extending line section 5c, where said condensate firstly accumulates. The length of the third line section 5c is dimensioned such that a considerable quantity of condensate can accumulate without said condensate rising above the highest fill level possible within the reducing agent tank 1. The hydraulically acting surfaces of the valve body 9 and the flexibility thereof are dimensioned such that the condensate column rising in the line section 5c can cause the valve body 9 to open, as illustrated in FIG. 4, specifically before the condensate column can reach the branch 6. The line section 5c is thereupon at least partially emptied counter to the closing force of the valve body 9. If the reducing agent tank 1 is immersed in liquid (water) in the installation position shown, then the hydrostatic pressure of the liquid acting from the outside intensifies the closing force of the valve body 9, such that an emptying of the third line section 5c is now no longer possible. Here, liquid (water) is reliably prevented from infiltrating into the deaeration line 5 from the outside.

The upper end (not illustrated) of the deaeration line is arranged in a region which cannot be submerged in water. Said end of the line may communicate with the atmosphere in a "protected" body region. Depending on the arrangement, no further measures to prevent the infiltration of water or dirt are required.

The third line section 5c of the deaeration line need not imperatively extend vertically downwards, and may also be arranged so as to run obliquely, but the third line section 5c is advantageously routed such that no loops or siphons are formed.

In the described exemplary embodiment, the first line section 5a extends obliquely at an angle of significantly less than 45° with respect to a horizontal. The invention is to be understood such that the angle of inclination or the degree of downward sloping of the first line section 5a may differ depending on the installation situation.

LIST OF REFERENCE SYMBOLS

1 Reducing agent tank
2 Aeration and deaeration opening
3 Pressure-compensating element
4 Deaeration hat
5 Deaeration line
5a First line section
5b Second line section
5c Third line section
6 Branch
7 Valve housing
8 Mushroom valve
9 Valve body
10 Drainage opening

What is claimed is:

1. Operating fluid tank for a motor vehicle, comprising a reducing agent tank for holding a liquid reducing agent for catalytic exhaust-gas denitrogenization, comprising at least one device for deaerating the tank, which device is closed off by means of at least one pressure-compensating element which permits an exchange of gas but which closes off the tank in a liquid-tight manner, and comprising at least one deaeration line which communicates with the pressure-compensating element, with the deaeration line being guided at least to a point above a maximum permissible fording level of the tank when the tank is in an installation position, and with the deaeration line having at least one first downward-sloping line section which branches into a second rising line section for deaeration and a third falling line section for gravity-induced condensate drainage.

2. Operating fluid tank according to claim 1, characterized in that at least the third line section is closed off by means of a drainage valve.

3. Operating fluid tank according to claim 2, characterized in that a length of the third line section is dimensioned such that the drainage valve can be actuated by the liquid column of the accumulated condensate.

4. Operating fluid tank according to claim 2, characterized in that the drainage valve is closed when unloaded.

5. Operating fluid tank according to claim 2, characterized in that the drainage valve has at least one flexible and/or resiliently elastic valve body whose hydraulically acting surfaces are dimensioned such that a rising liquid level from outside intensifies the closing force and such that condensate drainage on account of a rising liquid level from inside takes place only if the drainage valve is situated outside the fording level.

* * * * *